(12) United States Patent
Tinari (10) Patent No.: US 11,254,027 B2
(45) Date of Patent: Feb. 22, 2022

(54) SYSTEMS AND METHODS FOR PRODUCING CONCRETE STRUCTURES

(71) Applicant: Tinari 3D Inc., Coquitlam (CA)

(72) Inventor: Paul Tinari, Port Moody (CA)

(73) Assignee: TINARI 3D INC., Coquitlam (CA)

( * ) Notice: Subject to any disclaimer, the term of this patent is extended or adjusted under 35 U.S.C. 154(b) by 0 days.

(21) Appl. No.: 16/575,292

(22) Filed: Sep. 18, 2019

(65) Prior Publication Data
US 2021/0078200 A1    Mar. 18, 2021

(51) Int. Cl.
| | | |
|---|---|---|
| *B28B 1/00* | (2006.01) | |
| *B28B 17/00* | (2006.01) | |
| *E04B 1/16* | (2006.01) | |
| *B33Y 30/00* | (2015.01) | |

(52) U.S. Cl.
CPC .......... *B28B 1/001* (2013.01); *B28B 17/0081* (2013.01); *E04B 1/16* (2013.01); *B33Y 30/00* (2014.12)

(58) Field of Classification Search
CPC ....................................................... B28B 1/001
See application file for complete search history.

(56) References Cited

U.S. PATENT DOCUMENTS

| | | | | |
|---|---|---|---|---|
| 2005/0196484 A1* | 9/2005 | Khoshnevis | ............ | B28B 1/001 425/463 |
| 2013/0292039 A1* | 11/2013 | Peters | .................... | B33Y 30/00 156/168 |
| 2013/0345876 A1* | 12/2013 | Rudakevych | ............ | B25J 9/104 700/259 |
| 2015/0307321 A1* | 10/2015 | Breite | ..................... | B66B 7/062 187/254 |
| 2017/0095973 A1* | 4/2017 | Chamberlain | ......... | B33Y 30/00 |
| 2017/0350115 A1* | 12/2017 | Rocher | ................. | B29C 64/236 |
| 2018/0066441 A1* | 3/2018 | Chen-Iun-Tai | ......... | B33Y 50/02 |
| 2020/0040567 A1* | 2/2020 | Godi | ..................... | B33Y 30/00 |

FOREIGN PATENT DOCUMENTS

DE    102014015335 A1 *  4/2016   ............... E04B 1/16

OTHER PUBLICATIONS

A Little CNC History, Tormach Labs, Feb. 19, 2016 (Year: 2016).*
Machine translation of DE 102014015335, retrieved May 25, 2021 from EPO database (Year: 2021).*

* cited by examiner

*Primary Examiner* — Timothy Kennedy
(74) *Attorney, Agent, or Firm* — Nexus Law Group LLP; Nicholas P. Toth (57) ABSTRACT

The present invention is directed generally at three-dimensional printing and more particularly to using three-dimensional (3D) printing to produce concrete and concrete-like (i.e. hempcrete) structures. Recently, 3D printing has advanced to the point where it is now possible to 3D print more complex concrete structures, such as homes. Unfortunately, prior art methods of 3D printing concrete structures have numerous drawbacks. For example, many existing systems suffer from excessive mechanical complexity and/or are susceptible to jamming (e.g. caused by dirt getting into delicate mechanisms). Other problems include difficulty with field maintainability, a lack of horizontal and vertical construction scalability, excessive weight and/or difficulty in printing structures on uneven or difficult ground. Also, existing devices are difficult and time consuming to assemble and disassemble in the field, thereby increasing project costs. The present innovation successfully addresses all of these limitations.

10 Claims, 12 Drawing Sheets

SYSTEMS AND METHODS FOR PRODUCING CONCRETE STRUCTURES

BACKGROUND OF THE INVENTION

Field of the Invention

The present invention is directed generally three-dimensional printing and more particularly to using three-dimensional ("3D") printing to produce concrete structures.

Description of the Related Art

Recently the technology of 3D printing has advanced significantly and it is now possible to produce complex concrete structures, such as homes. Unfortunately, prior art methods of 3D printing concrete structures have manifested numerous drawbacks. For example, many existing systems suffer from excessive mechanical complexity and/or are susceptible to jamming (e.g. caused by dirt getting into delicate mechanisms). Other problems include difficulty with field maintainability, a lack of horizontal and vertical construction scalability, excessive weight & time requirements for system set-up/take-down, high costs and difficulties in printing structures on uneven or difficult ground.

In summary, some of the problems with existing large-scale, 3D concrete printers include the following:
Excessive mechanical complexity
Susceptibility to jamming because of dirt getting into the delicate mechanisms
Difficulty with field maintainability and difficulty in obtaining spare parts
Lack of horizontal and vertical construction scalability
Excessive weight & size consequently expensive to ship to remote locations
Significant time requirements for system set-up/take down
Difficulty in printing structures on uneven or difficult ground
High capital costs & high costs for spare parts The described process and/or the 3D printing system, 100, differs from existing technologies in a number of important ways. These include the following:
Existing systems use heavy truss structures or mechanically extendable, telescoping or robotic arms, limiting the size of the structures that they can construct. The use of a cable system means that the ultimate size of the structure that can be built is virtually unlimited.
Existing systems are mechanically complex, with literally hundreds of small parts that are sensitive to adverse field conditions, such as dirt and dust contamination. The proposed 3D printing system, 100, reduces the number of mechanical parts and it is field maintainable. It is able to successfully operate even in areas with mud, dirt, snow and dust.
The proposed 3D printing system, 100, is lighter in weight than existing designs, so it is more easily transported to remote locations.
The entire 3D printing system, 100, can be packaged in one standard shipping container.
The proposed 3D printing system, 100, can be assembled by two unskilled people and is field maintainable by relatively unskilled individuals.
The proposed 3D printing system, 100, is less expensive than existing designs because many of the parts can be 3D printed as required.

DETAILED DESCRIPTION OF THE INVENTION

Figure 1:
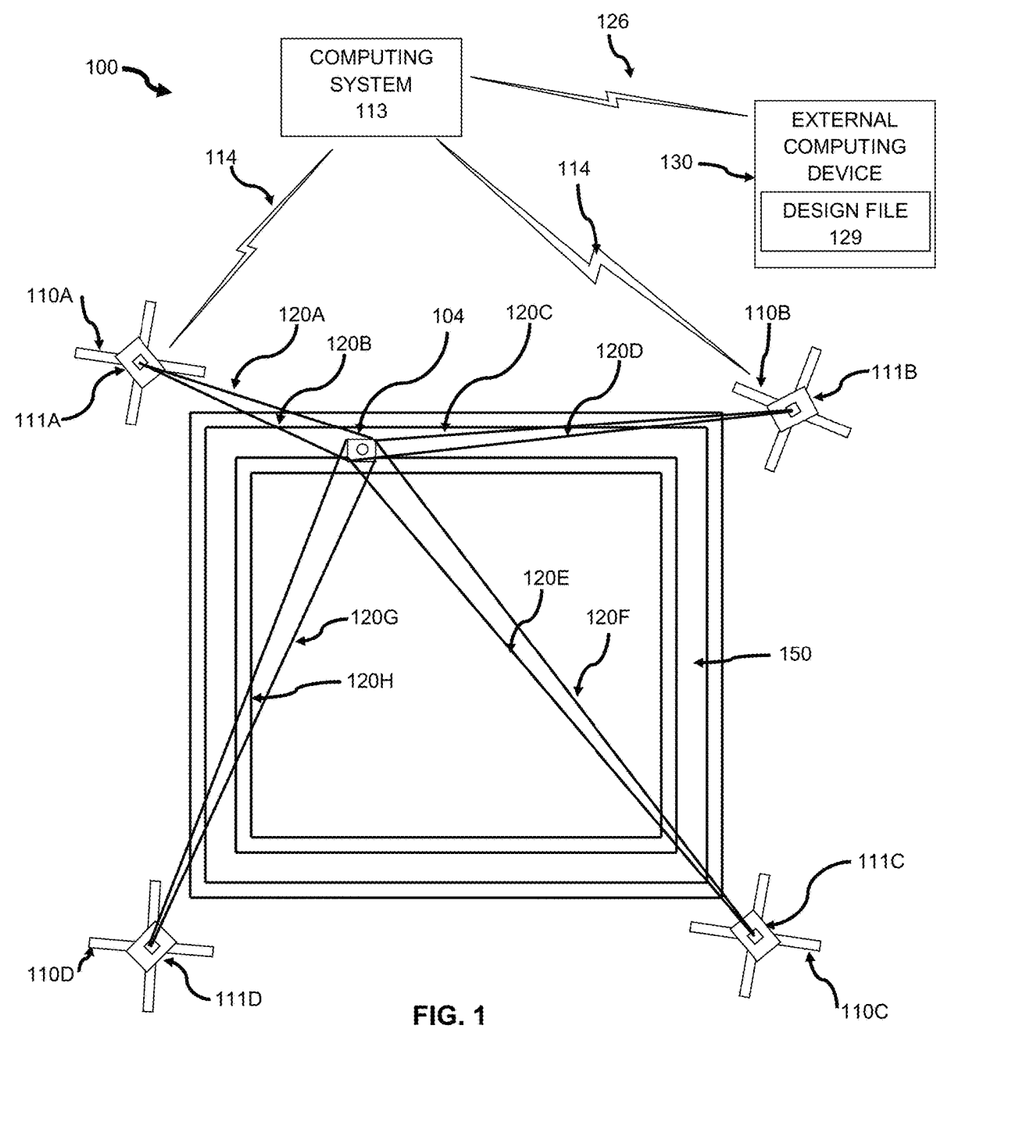
FIG. 1 is an illustration of a 3D printing system including four or eight positioning cables

Referring to FIG. 1, this application describes methods for producing concrete structures that are performed by a 3D printing system, 100. The 3D printing system, 100, may be characterized as including four subsystems: a nozzle/concrete dispensing system, 104, tower supporting systems, 110A-110D, control systems, 111A-111D and support cables, 120A-120H. In the embodiment illustrated, the cable control systems, that each include a tower assembly, 110A-110D one or more computer controlled stepper or servo motors and one or more cable control mechanisms housed inside a protective container (e.g. constructed from metal). The cable control system assemblies, 111A-111D may also include at least one computing system, 112, linked to each of the control modules by wired or wireless connections, 114. The cable system includes a set of four or eight positioning cables, 120A-120H attached to the support structure, 104, of the concrete dispensing nozzle, 603. Microfilament braided line or nano-composite fiber line may be used as the cables 120A-120H controlling the position of the nozzle 603. It is also possible to use other forms of flexible members, such as chains, to position the nozzle support structure, 104. A large number of such minor modifications are possible to the basic design proposed in this invention and they should be considered to be covered by the general intent of this patent. For example, it is possible to reduce the number of towers to three or to increase the number of towers to five or more without invalidating the intent of this patent. The tower assemblies 110A-110D may be human portable and thus may be portable. It is also possible to reduce the number of cables to three or four, or to increase the number of cables beyond the eight described here. Also, the mobile cable support carriage can be eliminated altogether, with both pulleys then being placed at the same elevation at the top of each of the towers.

Figure 1A:
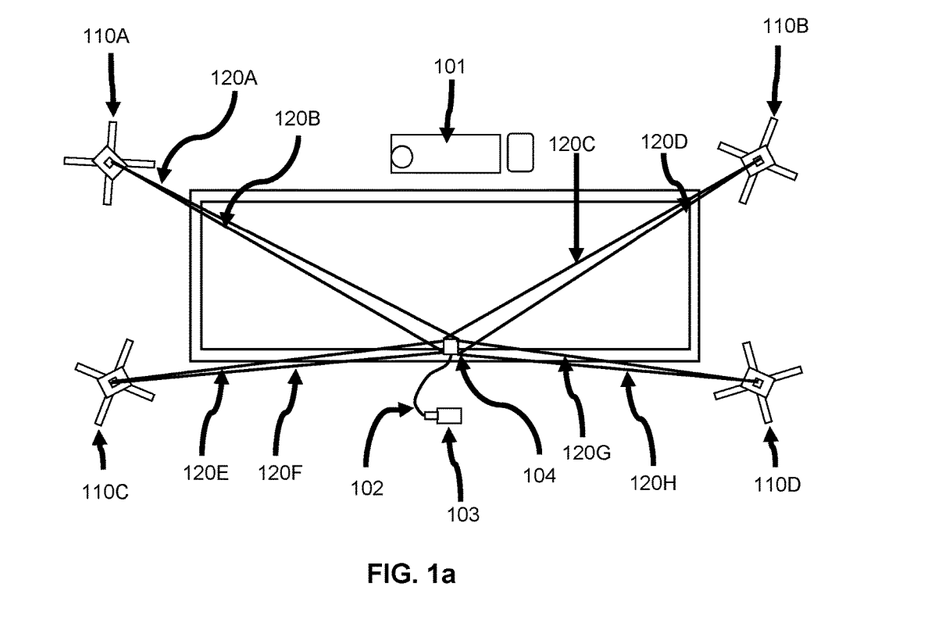
FIGS. 1a and 1b illustrate an embodiment of the 3D printing system that includes four relatively light, portable, modular towers, each connected to a control module.

A top view of the entire 3D Printing System, 100, is shown in FIG. 1a. Clearly shown are the four tower assemblies, 110A-110D, the nozzle positioning cables, 120A-120H, the concrete supply pipe, 102, the concrete supply truck, 101, and the concrete pumping system, 103.

Figure 1B:
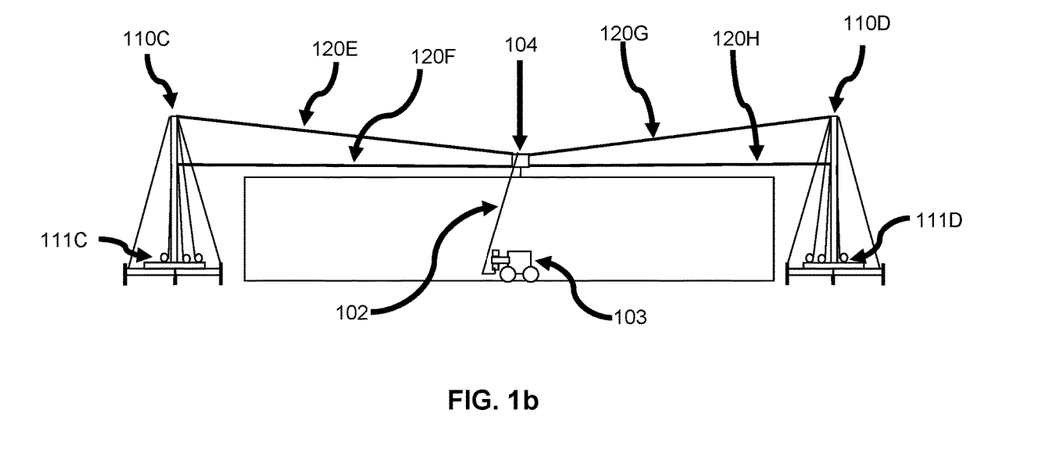

A side view of the entire 3D Printing System, 100, is shown in FIG. 1b. Shown are the two tower assemblies, 110C-110D, the concrete dispensing nozzle, 104, the nozzle positioning cables, 120E-120H, the concrete pump, 103, and the concrete supply pipe, 102.

Figure 2A:
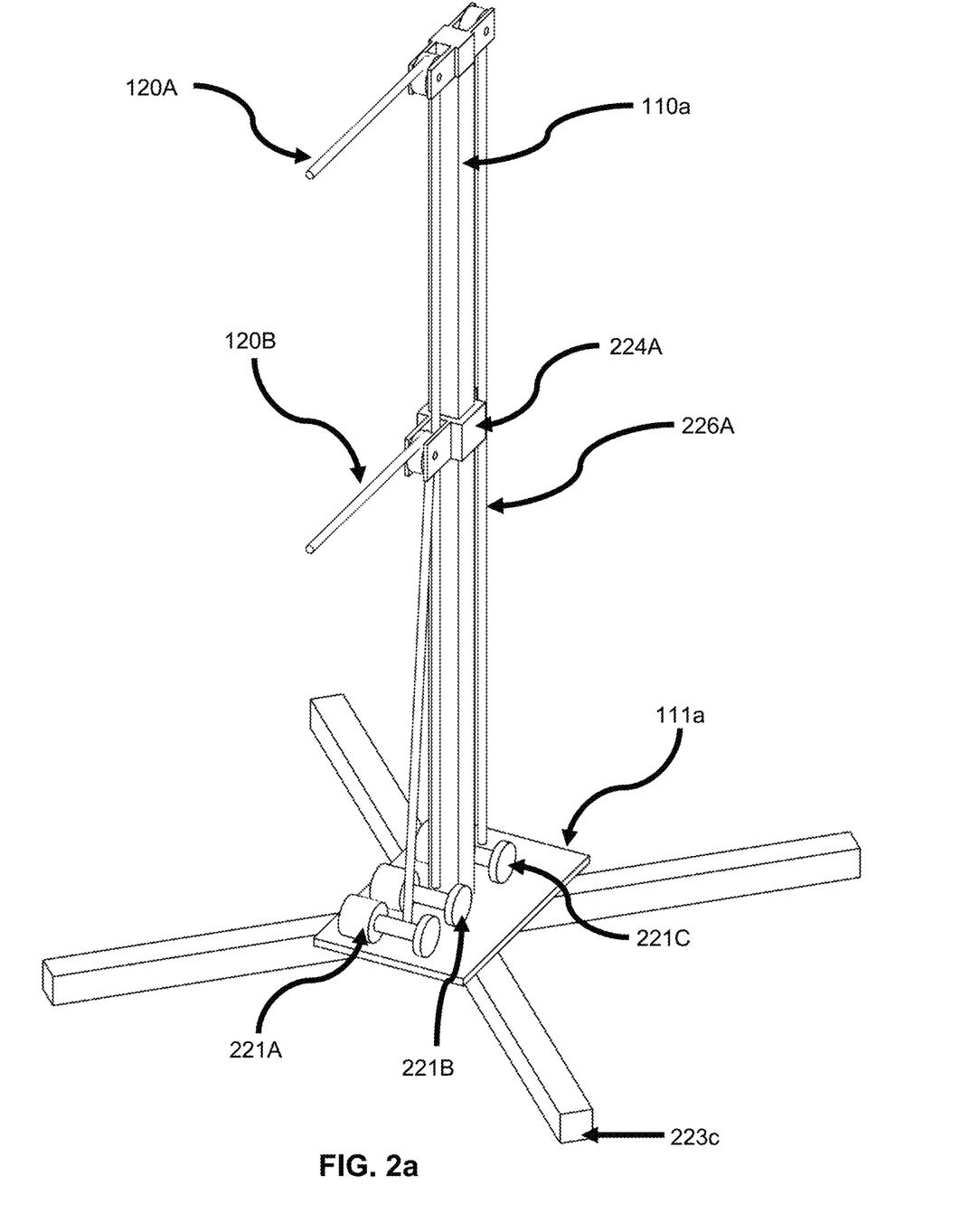
FIG. 2a illustrates a view of one of the mobile towers that support the pulleys that support the cables that control the position of the nozzle.

The details of the simplified tower system, 110A is shown in FIG. 2a. This includes a tower assembly, 110A, the upper & lower nozzle control cables, 120A, 120B, the cable positioning stepper motors, 221A and 221B and the lower cable support carriage, 224A. The lower cable support carriage, 224A, is free to move in a vertical direction, up and down the tower, 110A, to change the vertical position of the lower cable, 120B. The cable support carriage, 224A, is moved by a chain, 226A, operated by a stepper motor, 221C, located at the base of the tower assembly, 110A.

Figure 2B:
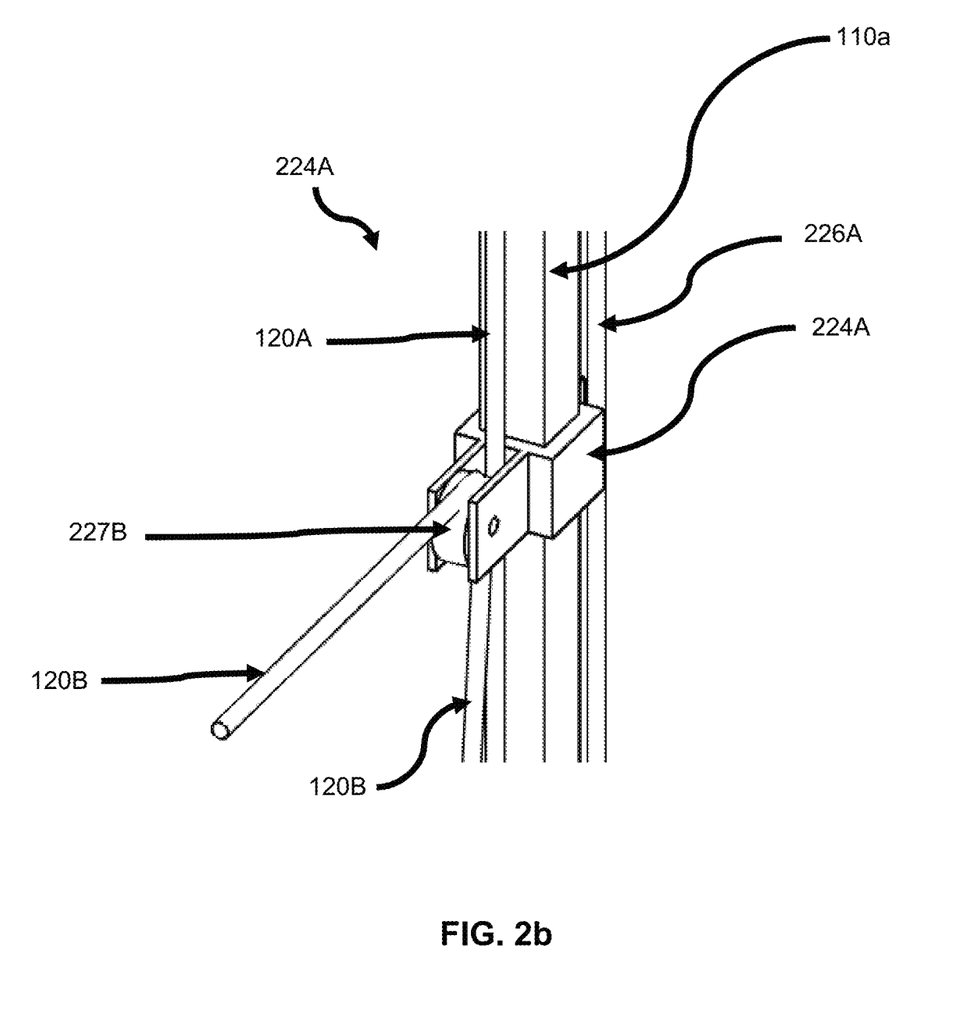
FIG. 2b illustrates a close-up view of the mobile platform that is constrained to move up & down the tower. The mobile platform supports a pulley that mounts one of the cables that supports the concrete dispensing nozzle.
Figure 6:
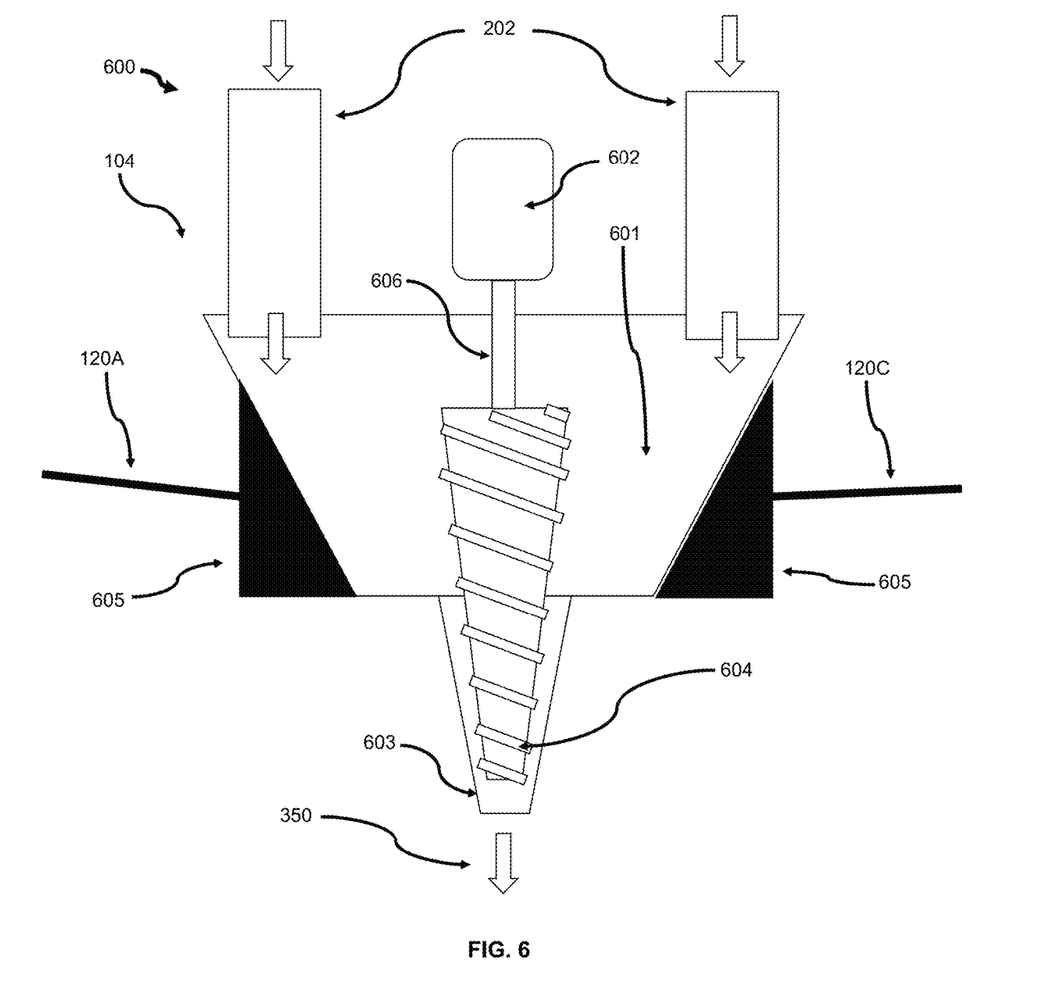
FIG. 6 is a diagram showing the details of the concrete dispensing nozzle
Figure 7:
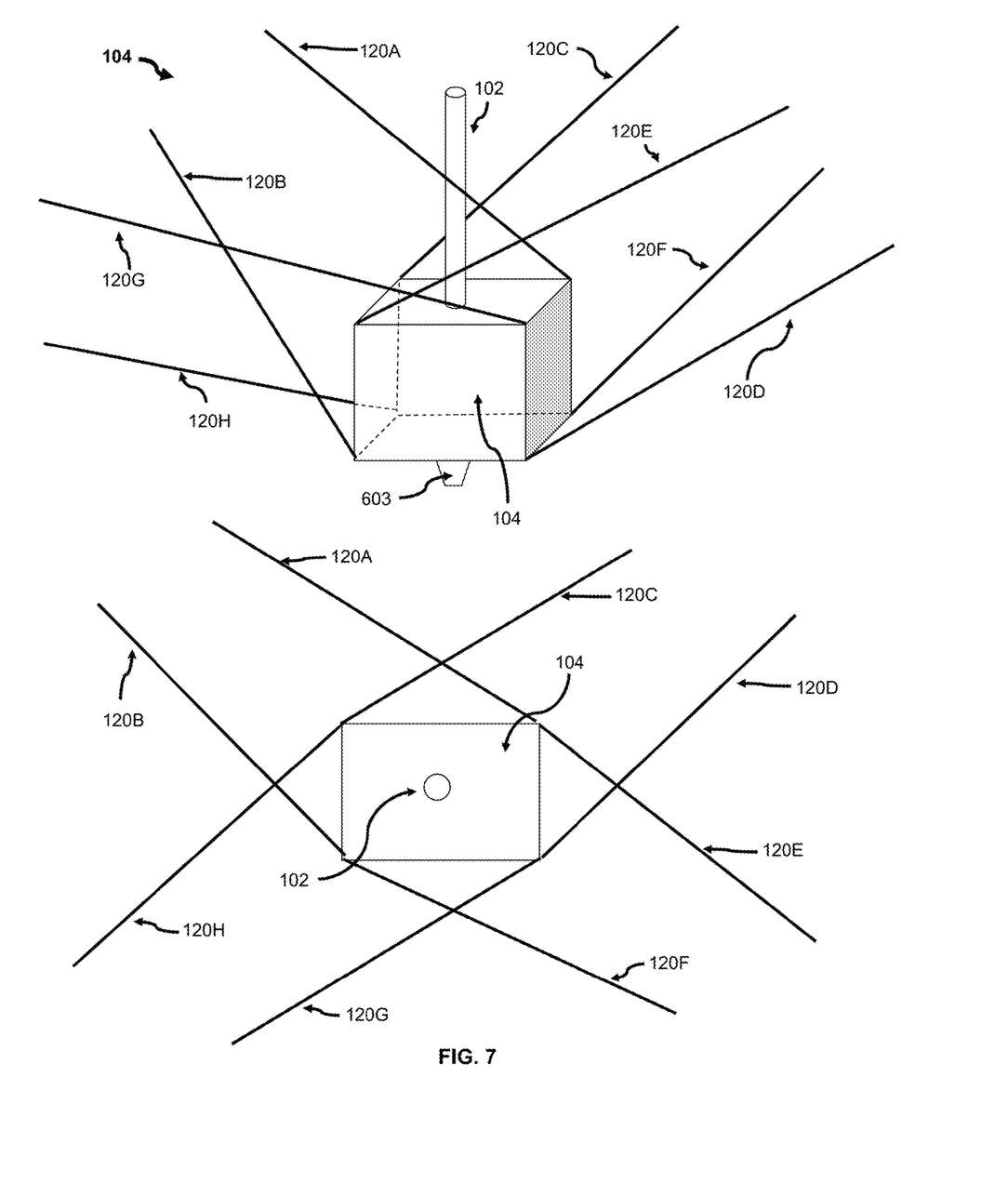
FIG. 7 is two diagrams (side & top views) showing the attachment configuration of the computer controlled positioning cables to the nozzle support structure.

The simplified details of the mobile cable support carriage, 224A are shown in FIG. 2b. The assembly 224A can move vertically on the tower support structure, 110A, and it supports a pulley, 227B. The vertical position of the assembly, 224A, is controlled by a chain or cable, 226A, that is moved by a stepper motor, 221C, or positioning screw 221C, located at the base of the tower assembly, 110A. The carriage 224A supports a pulley system, 227B, that controls the position of the lower cable, 120B. In at least some embodiments, the pulley 227B (FIG. 2b) is attached to the positioning screw 221C (FIG. 2a) that can control the height of the lower pulley 227B. The lower positioning cable 120B that is connected to the nozzle support structure 104 at its lower end (side perspective view of FIG. 7) is moveably attached to the movable platform 224A by engagement with the lower pulley 227B (FIGS. 2a and 2b). FIG. 1a shows that the positioning screw 221C (FIG. 2a) is operable to control a vertical distance between the lower pulley 227B (FIG. 2b) and the nozzle 603 (FIGS. 6 and 7). The cable, 120A, passes behind the pulley, 227B, to go to the pulley, 227A, at the top of the tower, 110A.

Figure 2C:
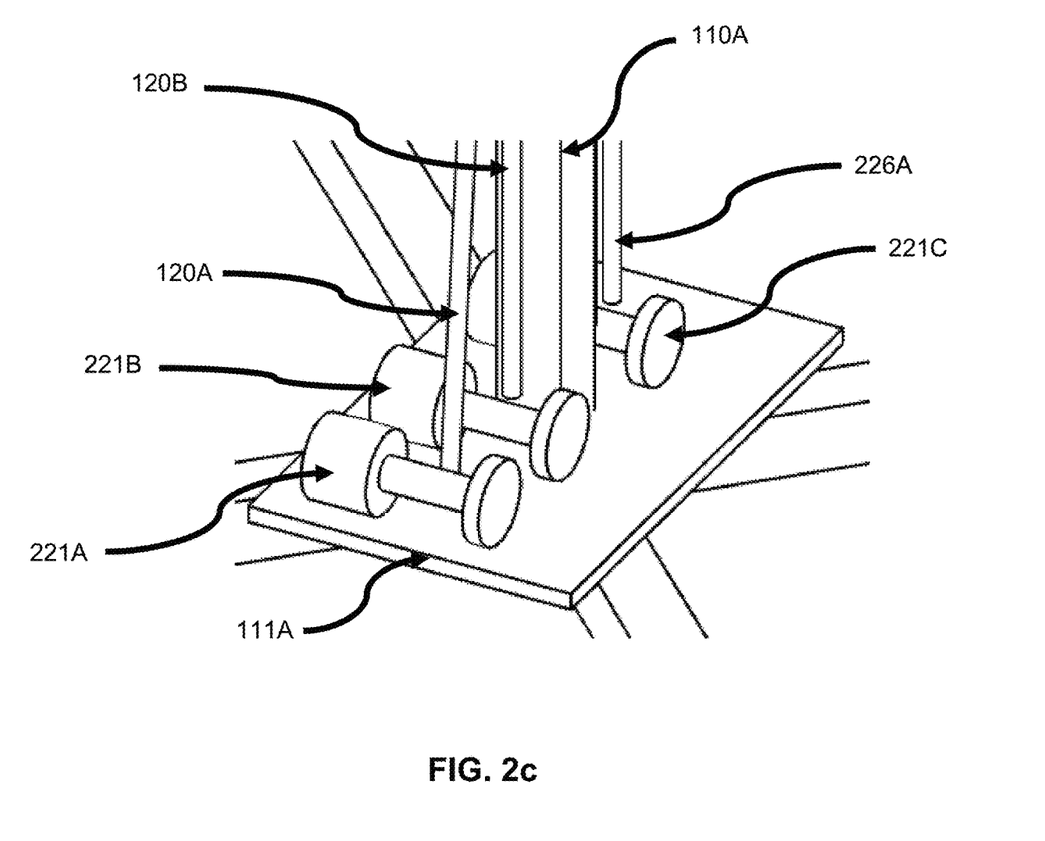
FIG. 2c illustrates a close-up view of the base of the supporting tower showing the computer-controlled stepper motors that are responsible for moving the cables that are positioning the concrete dispensing nozzle.

The simplified details of the base of the tower assembly, 110A, is shown in FIG. 2c. The two stepper motors 221A and 221B, control the position of the cables 120A, 120B, that connect to the nozzle, 104, and the stepper motor 221C, moves a cable or chain, 226A, that controls the position of the movable platform, 224A, that supports the lower cable, 120B.

Figure 2D:
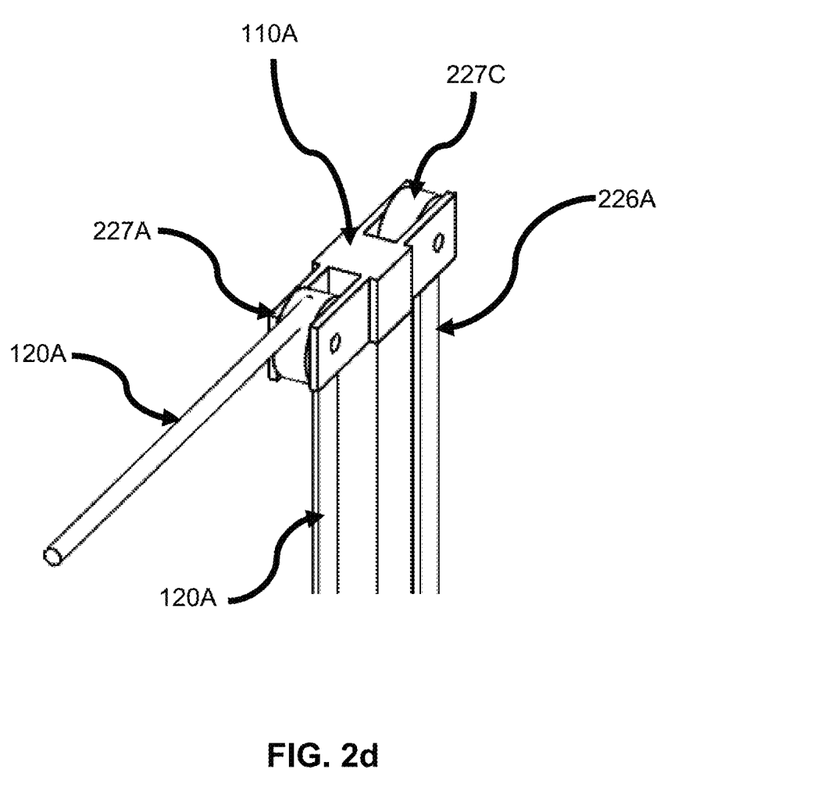
FIG. 2d illustrates a close-up view of the top of a supporting tower showing the fixed cable pulley, the chain that raises or lowers the mobile platform shown in FIG. 2b and the six tower stabilization cables.

The simplified details of the top of the tower assembly, 110A, is shown in FIG. 2d. Shown are the chain or cable, 226A, that is used to raise the movable cable support carriage, 224a. The chain or cable, 226A, passes over a pulley, 227C, located at the top of the tower, 110A. Also shown is the upper pulley, 227A, that is fixed to the tower assembly, 110A, that supports the upper cable, 120A, that helps position the nozzle, 104.

Figure 2E:
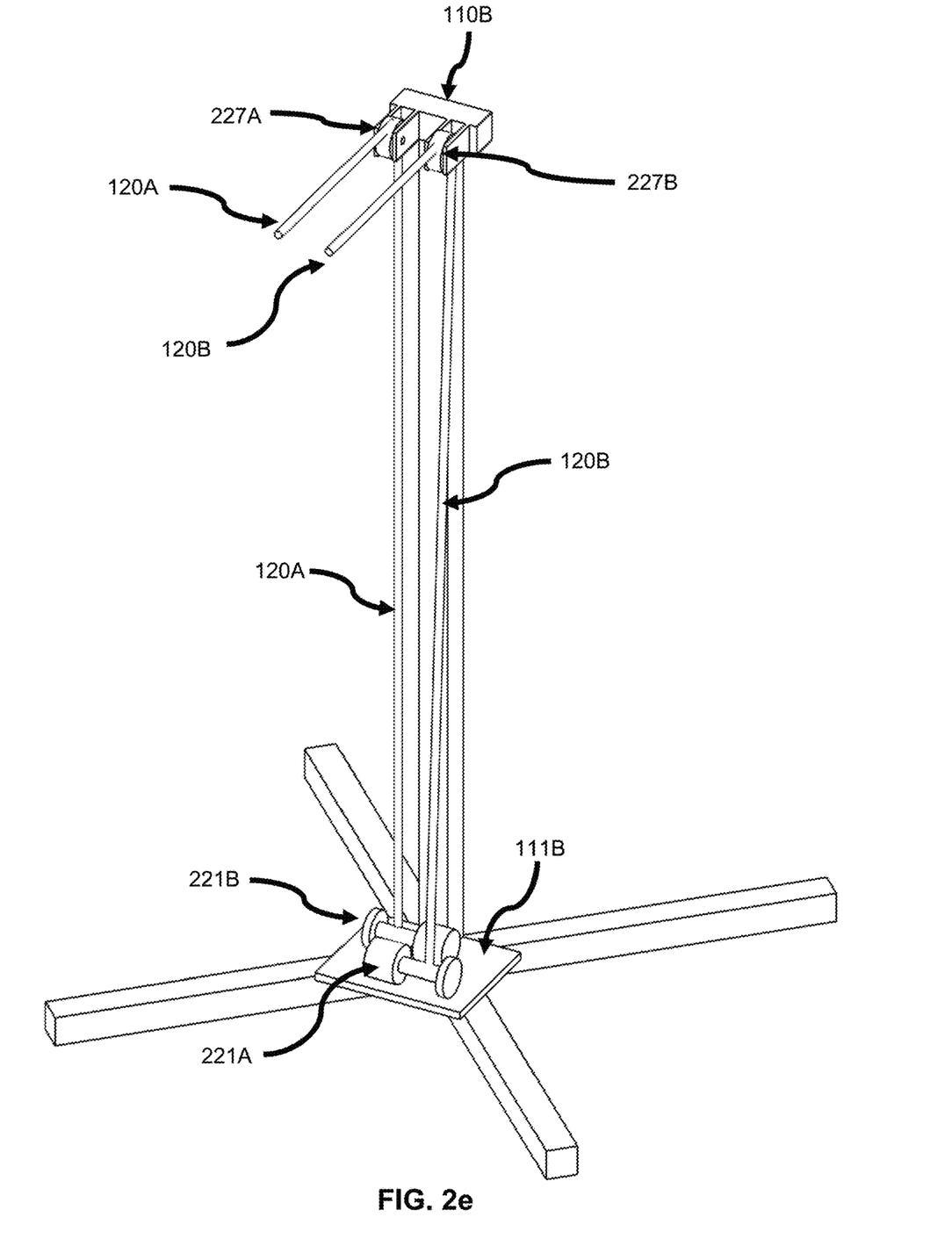
FIG. 2e, shows a simplified design for the cable support towers.

An alternate simplified design for the towers, 110A, is shown in FIG. 2e. This simplified design should also be considered to be covered by the intent of this patent. Here both of the cables, 120A and 120B pass over the pulleys, 227A and 227B that are both located at the top of the tower, 110A. The length of the cables, 120A and 120B, are controlled by the electric stepper/server motors positioned at the base of the tower, 110A.

Figure 3:
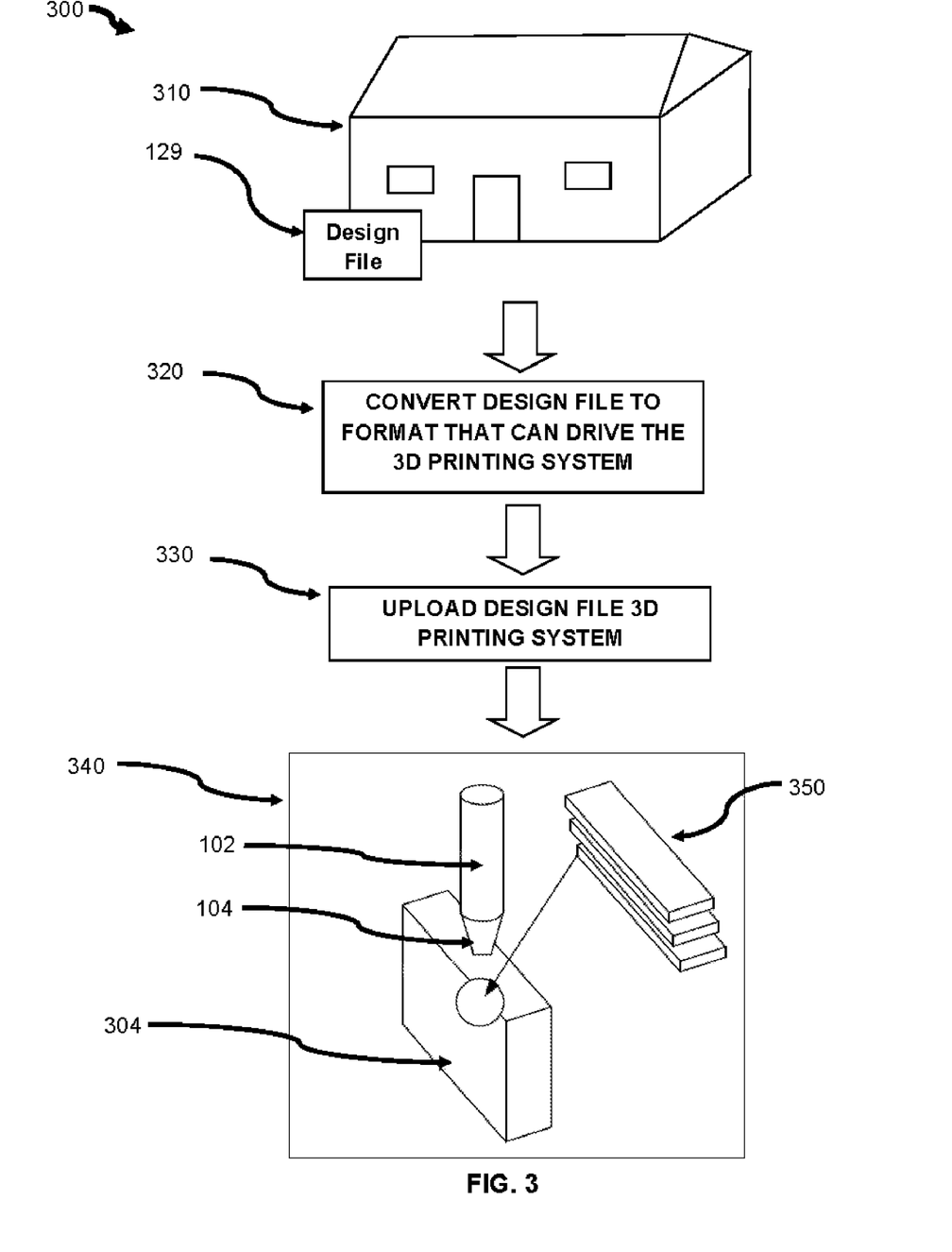
FIG. 3 illustrates a method of using a model, design template, or design file to generate a structure (e.g. a house).

The nozzle support structure, 104 is connected to a source of a specially prepared formulation of concrete (the "concrete mix") by a flexible pipe 102 (see FIGS. 1a, 1b). The nozzle support structure, 104 is accurately positioned in three dimensional space by any one of a number of methods, such as for example, by use of computer controlled stepper or servo motors. The cable control system assembly 111 may activate the cable system, 120, which uses the series of positioning cables 120A to 120H, attached to the nozzle support structure, 104. FIG. 3 illustrates a method, 300, of using a model, design template, or design file 124 to generate a structure 304 (e.g. a house). At the first block 310, a computer aided drawing ("CAD") program is used to create the design file 124 of the structure 304 to be created. In the next block 320, the design file 124 may be translated into a format (such as G-Code) that is recognizable by the 3D printing system 100. Referring to FIG. 1, in block 330 (see FIG. 3), the design file 124 may be uploaded (via a wired or wireless connection 126) to the cable control system assembly 110 (e.g. to the computing system 112) from an external computing device 130, translating the file into a form that can be recognized by the 3D Printing System (such as G-Code), and then using this information to operate the 3D Printing machine 100. Returning to FIG. 3, in block 340, the (optionally translated) design file 124 may be used by the computing system 112 to accurately position the nozzle support structure, 104 as it dispenses the concrete mix at a steady rate. The nozzle support structure, 104 moves and dispenses the concrete mix in successive layers 350 according specifications and/or instructions (e.g. G-Code instructions) included to the design file 124. The method 300 terminates when all of the instructions included in the design file 124 have been executed by the 3D printing system 100.

When the 3D printing system 100 is used to create the structure 304 (e.g. a house), the nozzle support structure, 104 is first positioned in a horizontal plane equal to lowest level of the structure 304, where the nozzle 104 lays down a continuous ribbon or first layer of the concrete mix that is used to create the walls of the structure, according to the uploaded design file 124 template. After the first layer of the concrete mix has been completed, the cable control system assembly 110 raises the nozzle support structure, 104, by the width of one layer and then the nozzle support structure, 104 deposits the second layer of the concrete mix directly on top of the first layer. This process is repeated and continues until the entire structure has been completed.

The Control System

Figure 4:
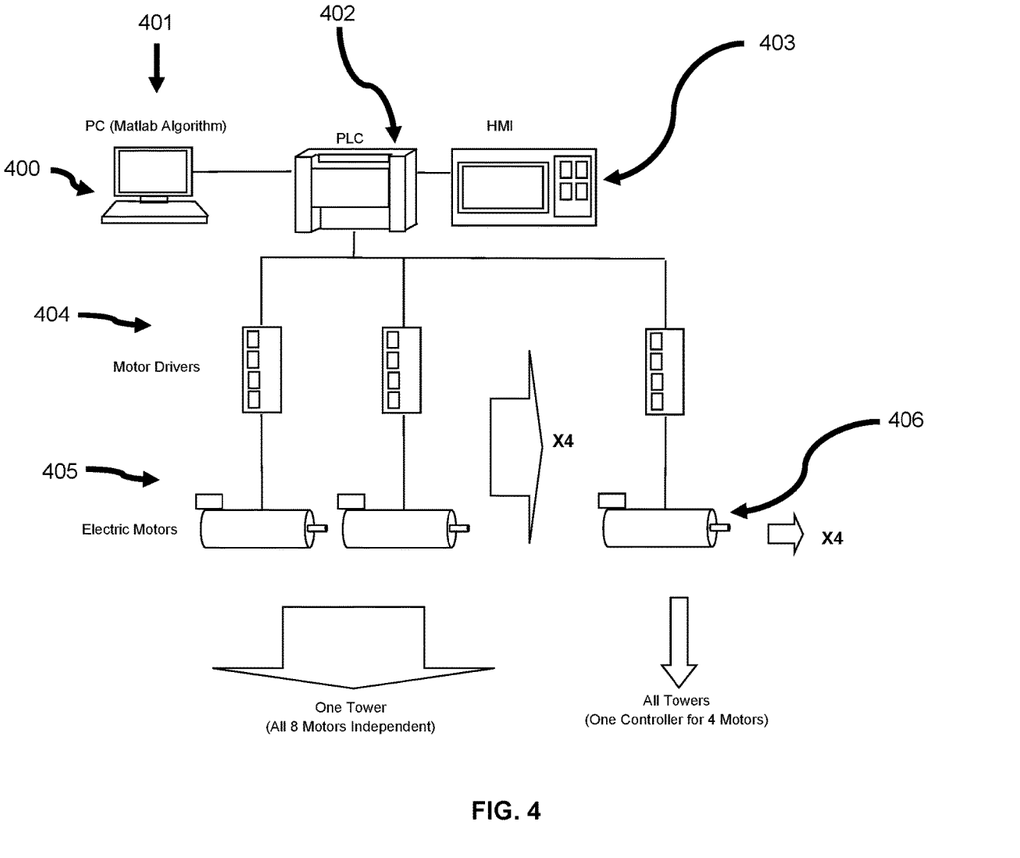
FIG. 4 illustrates the structure of the system that controls the operation of the four or eight independent motors that accurately positions the cables connected to the nozzle as well as the four linear actuators that position the height of the cables above the ground (z=0 position).

The schematic FIG. 4 shows the design of the control system, 400, including a dedicated PC running the proprietary software algorithm, 401, that feeds into the Programmable Logic Controller (PLC), 402, to which is also attached a Supervisory Control Data Acquisition Module and a Human-Machine Interface (SCADA/HMI), 403. The PLC, 402, sends control signals to the four or eight independently operating stepper motors, 405, that operate each of the four or eight cables attached to the nozzle support structure, 104, and to each of the multitude of linear actuator motors located on each of the cable support towers.

Accurate Position Control of the Nozzle Support Structure

Gyroscopic Stabilization can be used to prevent oscillations in the cables 120A-120H from affecting the accurate positioning of the concrete dispensing nozzle 603. Other stabilizing mechanisms may be used as well. A standard (x,y,z) laser positioning system can be used to accurately determine the location of the nozzle at each time step. The disadvantage with the use of steel cables, 120A-120H, is that the intrinsic elasticity of the cables will induce errors in positioning. These errors can be reduced by the use of a number of methods, such as for example, the use chains instead of cables to support the nozzle support structure, 104. The program fed into the 3D printing control computer, 113, establishes the position required of the nozzle 104 at each point in time. The laser positioning system makes a measurement of the actual position of the nozzle at the same time, to a specified accuracy. The computer 113 computes the difference between the required (x,y,z) position of the nozzle support structure, 104, and the actual measured position at each time-step. The computer, 113, then sends a signal to the control boxes 111A-111D, that will then adjust the tensions in the positioning cables 120A-120H, so that the accurate position of the nozzle 104 is maintained at each time-step.

Through application of ordinary skill in the art to the present teachings, alternate stabilizing and positioning mechanisms may be used and all such control mechanisms for positioning and stabilizing the concrete dispensing nozzle, 603 are within the scope of the present teachings are covered by this patent.

Computing Device

Figure 5:
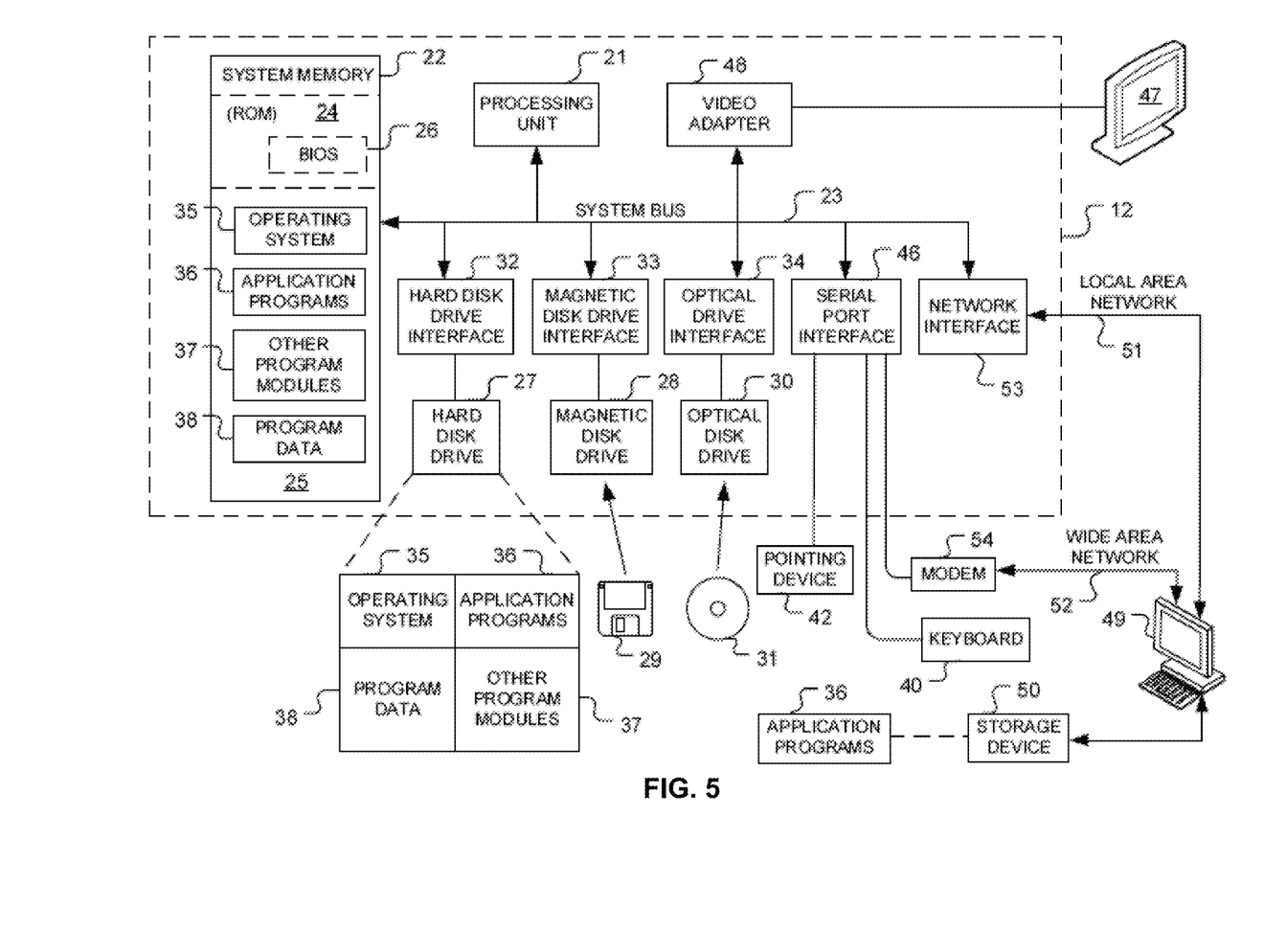
FIG. 5 is a diagram of a hardware environment and an operating environment in which the computing devices of the system of FIG. 1 may be implemented.

FIG. 5 is a diagram of hardware and an operating environment in conjunction with which implementations of the computing system 112 and/or the external computing device, 130, may be practiced. The description of FIG. 5 is intended to provide a brief, general description of suitable computer hardware and a suitable computing environment in which implementations may be practiced. Although not required, implementations are described in the general context of executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices such as cell phones or tablets, multiprocessor systems, microprocessor-based or programmable consumer electronics, network PCs, minicomputers, mainframe computers and the like. Implementations may also be practiced in distributed computing environments (e.g. cloud computing platforms) where tasks are performed by remote processing devices that are linked through a communications network. In a distributed computing environment, program modules may be located in both local and remote memory storage devices.

The exemplary hardware and operating environment of FIG. 5 includes a general-purpose computing device in the form of the computing device 12. The computing system 112 and/or the external computing device 130 may each be substantially identical to the computing device 12. By way of non-limiting examples, the computing device 12 may be implemented as a laptop computer, a tablet computer, a web enabled television, a personal digital assistant, a game console, a smart-phone, a mobile computing device, a cellular telephone, a desktop personal computer and the like.

The computing device 12 includes a system memory 22, the processing unit 21 and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof and the like. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide non-volatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs) and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37 and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g. a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g. a Bluetooth interface). A monitor 47 or other type of display device is also connected to the system bus 23 via an interface, such as a video adapter 48. In addition to the monitor, computers typically include other peripheral output devices (not shown), such as speakers, printers and haptic devices that provide tactile and/or other types of physical feedback (e.g. a force feedback game controller). The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 10 include a local-area network (LAN) 51 and a wide-area network (WAN) 52. Such networking environments are commonplace in offices, enterprise-wide computer networks, intranets and the Internet.

Those of ordinary skill in the art will appreciate that a LAN may be connected to a WAN via a modem using a carrier signal over a telephone network, cable network, cellular network, wireless network or power lines. Such a modem may be connected to the computing device 12 by a network interface (e.g. a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used. The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods. Such instructions may be stored on one or more non-transitory computer-readable media.

The methods refers to a computer building up a 3D model one layer at a time, from the bottom upward, by repeatedly printing over the same area in a method known as Slurry Depositional Modeling (SDM). Working entirely automatically, the printer creates a model over a period of hours by turning a 3D CAD drawing into a multitude of two-dimensional, cross-sectional layers—effectively separate 2D prints that sit one on top of another. In this embodiment, the printer deposits layers of cement, one on top of the other.

The foregoing described embodiments depict different components contained within, or connected with, different other components. It is to be understood that such depicted architectures are merely exemplary and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein and especially in the appended claims (e.g. bodies of the appended claims) are generally intended as "open" terms (e.g. the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g. "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Internal Structure of the Nozzle

With reference to FIG. 6, the nozzle assembly 600 consists of the nozzle support structure, 104, and a concrete dispensing nozzle, 603, that receives concrete mix from the concrete delivery pipe, 102, that delivers the concrete to an accumulator 601 and then to an internal rotating Archimedean Screw 604 driven by a shaft 606 connected to a small electric motor 602 linked to the automatic control system 112. The purpose of the Archimedean Screw 604, is to allow the nozzle, 603, to dispense concrete at a constant rate regardless of any irregularities in the delivery of the concrete to the nozzle, 603, by the concrete pumping system, 103. The nozzle support structure, 104 moved by the cables 120A-120H and the path followed by the nozzle, 603, is smoothed by the stabilization system, 605, attached to the side of the nozzle support structure, 104.

Configuration of Cable Attachment to Nozzle Support Structure

With reference to FIG. 7, the configuration of the attachment of the eight positioning cables, 120A-120 H, to the nozzle support structure, 104 is clearly shown with a side and top view. As can be seen in the side perspective view of FIG. 7, the nozzle support structure 104 defines a lower end near the nozzle 603 and and an upper end opposite the lower end. Visibly, the upper end is further from the nozzle 603 than is the lower end. Also visible in the side perspective view of FIG. 7 is that the positioning cables 120A-120H are connected to the nozzle support structure 104 at both the lower and upper ends of the nozzle support structure 104. FIGS. 1b, 2a, and 2b show the positioning cables 120F and 120H being connected to the nozzle support structure 104 at its lower end and extending to the lower pulleys (e.g. lower pulley 227B of FIG. 2b). FIGS. 1b, 2a, and 2d show the positioning cables 120E and 120G (FIG. 1b) being connected to the nozzle support structure 104 at its upper end and going around the pulleys (e.g. pulley 227A of FIG. 2d) at the top of a corresponding tower (e.g. tower 110A of FIG. 2d). The side perspective view of FIG. 7 shows pairs of positioning cables in vertical alignment with each other, with one positioning cable (e.g. 120F) connected to the nozzle support structure 104 at its lower end and another positioning cable of the pair connected to the nozzle support structure 104 at its upper end (e.g. 120A). The side perspective view of FIG. 7 shows sets of four positioning cables (e. 120A, 120B, 120C, and 120D) in which a first positioning cable 120B is shown connected to the nozzle support structure 104 at its lower end, a second positioning cable 120A is shown connected to the nozzle support structure 104 at its upper end, a third positioning cable 120D is shown connected to the nozzle support structure 104 at its lower end, and a fourth positioning cable 120C is shown connected to the nozzle support structure 104 at its upper end, such that none of the first, second, third, and fourth positioning cables 120A, 120B, 120C, or 120D is, at the nozzle support structure 104, in vertical alignment with another of the first, second, third, and fourth said positioning cables 120A, 120B, 120C, and 120D. The configuration of cables is designed to ensure stability of the nozzle support structure, 104, by ensuring that the tension exerted by each pair of cables, such as 120A-120B is kept in constant counter tension by another pair of cables, such as for example, 120E-120F.

The invention claimed is:

1. A three-dimensional printing system comprising:
A plurality of towers that support a plurality of positioning cables that control the position of a nozzle support structure that contains a concrete-dispensing nozzle;
the nozzle being configured to dispense a concrete mix, the nozzle support structure defining lower and upper ends thereof, the lower end being proximate to the nozzle and the upper end being opposite the lower end and distal from the nozzle;
a cable system comprising the plurality of positioning cables defining a plurality of vertical pairs of said positioning cables, each said vertical pair comprising a lower and upper said positioning cable connected to the nozzle support structure at the lower and upper ends, respectively; and
a control system comprising a plurality of control modules connected to the plurality of positioning cables, the plurality of control modules being operable to control the position of the nozzle support structure,
wherein each said positioning cable that is connected to the nozzle support structure at the lower end is moveably attached to a movable platform attached to said each tower, a portion of said each tower comprises a pulley, said each positioning cable extends from a corresponding said control module, and wherein said each positioning cable that is connected to the nozzle support structure at the upper end goes around the pulley at a top of a corresponding said tower, then down to a lower pulley attached to a positioning screw that can control the height of the lower pulley above the ground level.

2. The three-dimensional printing system of claim 1, further comprising:
a plurality of support cables each coupled to a different one of the plurality of towers; and a pipe connected to the nozzle and supplying the concrete mix thereto, the plurality of support cables supporting the pipe above the nozzle.

3. The three-dimensional printing system of claim 2, further comprising: a concrete pumping unit configured to pump the concrete mix into the pipe.

4. The three-dimensional printing system of claim 3, wherein the nozzle comprises an accumulator and an internal rotating Archimedean Screw linked to the control system, thereby allowing the pumped concrete to be dispensed from the nozzle at a steady rate regardless of irregularities in the delivery of the concrete to the nozzle by the concrete pumping unit.

5. A three-dimensional printing system comprising:
a plurality of towers that support a plurality of positioning cables that control the position of a nozzle support structure that contains a concrete-dispensing nozzle;
a nozzle configured to dispense a concrete mix, the nozzle support structure defining lower and upper ends thereof, the lower end being proximate to the nozzle and the upper end being opposite the lower end and distal from the nozzle;
a cable system comprising the plurality of positioning cables defining a plurality of vertical pairs of said positioning cables, each said vertical pair comprising a lower and upper said positioning cable connected to the nozzle support structure at the lower and upper ends, respectively; and
a control system comprising a plurality of control modules connected to the plurality of positioning cables, the plurality of control modules being operable to control the position of the nozzle support structure,
wherein the plurality of positioning cables is connected to the nozzle support structure such that at least one pair of the cables is in counter tension with at least two other said positioning cables, thereby assuring stability of the three-dimensional printing system,
and wherein said at least one pair of positioning cables comprises a first said positioning cable connected to the nozzle support structure at the lower end and a second said positioning cable connected to the nozzle support structure at the upper end, said at least two other positioning cables comprises a third said positioning cable connected to the nozzle support structure at the lower end and a fourth said positioning cable connected to the nozzle support structure at the upper end, and wherein none of the first, second, third, and fourth said positioning cables is, at the nozzle support structure, in vertical alignment with another of the first, second, third, and fourth said positioning cables.

6. The three-dimensional printing system of claim 1, wherein said each positioning cable that is connected to the nozzle support structure at the lower end is moveably attached to the movable platform by engagement with the lower pulley.

7. The three-dimensional printing system of claim 1, wherein the positioning screw is operable to control a vertical distance between the lower pulley and the nozzle.

8. A three-dimensional printing system comprising:
a plurality of towers that support a plurality of positioning cables that control the position of a nozzle support structure that contains a concrete-dispensing nozzle, the plurality of positioning cables comprising a microfilament braided line or a nano-composite fiber line, the concrete-dispensing nozzle being configured to dispense a concrete mix;
a cable system comprising the plurality of positioning cables connected to the nozzle support structure;
a control system comprising a plurality of control modules, each said control module being connected to a different corresponding one of the plurality of positioning cables, said each control module controlling a distance that the corresponding positioning cable positions the nozzle support structure from said each control module; and
a plurality of portable towers each with adjustable heights, each said positioning cable being moveably attached to a movable platform attached to each said portable tower, respectively, wherein a portion of said each portable tower comprises a pulley, said each positioning cable extending from a corresponding said control module, then going around the pulley at a top of a corresponding said portable tower, then down to a lower pulley attached to a positioning screw that can control a height of the lower pulley above the ground level and to the nozzle.

9. The three-dimensional printing system of claim 8, further comprising:
a plurality of support cables each coupled to a different one of the plurality of portable towers; and
a pipe connected to the nozzle and supplying the concrete mix thereto, the plurality of support cables supporting the pipe above the nozzle.

10. The three-dimensional printing system of claim 9, further comprising:
a concrete pumping unit configured to pump the concrete mix into the pipe.

* * * * *